United States Patent [19]

Inoue

[11] 4,279,748
[45] Jul. 21, 1981

[54] HIGH-FIELD GRADIENT MAGNETIC SEPARATOR

[75] Inventor: Kiyoshi Inoue, Tokyo, Japan

[73] Assignee: Inoue-Japax Research Incorporated, Yokohamashi, Japan

[21] Appl. No.: 16,422

[22] Filed: Mar. 1, 1979

[30] Foreign Application Priority Data

Mar. 8, 1978 [JP] Japan .................................. 53-26940
Apr. 4, 1978 [JP] Japan .................................. 53-39965

[51] Int. Cl.³ ........................................ B01D 35/06
[52] U.S. Cl. .................................. 210/222; 210/510; 210/85
[58] Field of Search ............... 210/222, 223, 510, 224, 210/225, 226, 227, 228, 229, 230, 231, 85

[56] References Cited

U.S. PATENT DOCUMENTS

| | | | |
|---|---|---|---|
| 2,429,920 | 10/1947 | Bourne, Jr. | 210/222 |
| 2,450,630 | 10/1948 | Bourne, Jr. | 210/222 |
| 2,893,561 | 7/1959 | Duzich | 210/223 |
| 3,051,988 | 9/1962 | Baermann | 210/222 |
| 3,124,725 | 3/1964 | Levuillon | 210/222 |
| 3,126,924 | 3/1964 | Kirkpatrick | 210/222 |
| 3,136,720 | 6/1964 | Baermann | 210/222 |
| 3,186,549 | 6/1965 | Botstiber | 210/222 |
| 3,349,918 | 10/1967 | Ike | 210/252 |
| 3,446,906 | 3/1969 | Zulauf | 210/510 |
| 3,477,948 | 11/1969 | Inoue | 210/223 |
| 3,539,509 | 11/1970 | Hertmann et al. | 210/222 |
| 3,567,026 | 3/1971 | Kolm | 210/222 |
| 3,768,233 | 10/1973 | Mateson | 210/222 |
| 3,785,494 | 1/1974 | Soma | 210/510 |
| 3,841,486 | 10/1974 | Hertmann | 210/222 |
| 3,842,006 | 10/1974 | Burt | 210/510 |
| 4,087,358 | 5/1978 | Oder | 210/222 |

FOREIGN PATENT DOCUMENTS 1461491 4/1965 Fed. Rep. of Germany .......... 210/222

Primary Examiner—Theodore A. Granger
Attorney, Agent, or Firm—Karl F. Ross

[57] ABSTRACT

A magnetic separator has a filter mass to which a magnetic field of a high gradient applies to trip magnetically susceptible substances in a fluid stream traversing the mass. The change in inductance of the mass is measured during the filtration and the measurement triggers an operator-alert signal and/or a backwashing of the filter.

10 Claims, 22 Drawing Figures

4,279,748

HIGH-FIELD GRADIENT MAGNETIC SEPARATOR

FIELD OF THE INVENTION

The present invention relates to a magnetic separator and, more particularly, to a magnetic separator including a filter mass traversed by a fluid stream containing magnetically susceptible components to be collected by the mass which is adapted to apply a magnetic field of a high field gradient upon the fluid.

BACKGROUND OF THE INVENTION

In conventional magnetic separators or filters of this type, the filter mass is constituted as a mass of discrete particles or bodies of a magnetic material such as a magnetic grade stainless wool which may be subjected to an external magnetic field sufficient in magnitude to effect magnetization to provide a large number of regions in the mass of high magnetic field gradient along the paths of travel of the filtrable fluid to attract and retain the magnetic components and also to mechanically trap non-magnetic components therewith. Typical examples of such traditional magnetic separators and methods of their operations are described, for example, in U.S. Pat. Nos. 3,477,948 to K. INOUE and 3,567,026 to H. H. KOLM.

Important considerations in designing and operating of a magnetic separator for treating filtrable fluids are, as generally applicable to other filtering and separation techniques, reliability, efficiency and long operating life of the system. Thus it is known that the throughput of filtrate through the filter mass falls off with time as a consequence of the accumulation of a filter cake or residue upon the filtering mass and that it is then necessary to back-flush the filter mass to dislodge the magnetically attracted or mechanically retained contaminants or residues from the filter mass for a subsequent filtering operation. A problem therefore lies in determining, for the purposes of efficient use of the filter mass and insuring an extended life thereof, the precise time at which the filtering operation should be terminated and the back flushing effected. This is especially the case where the filterable fluid contains magnetically susceptible components of a sub-microscopic size where a drop in capability or filtering rate of a magnetic separator cannot adequately be determined by a simple measurement of head or pressure differentials between inlet and outlet sides of the filter mass or otherwise. Differences in filtering capability affect the efficiency of successive filtering cycles and the excessively prolonged time span of its use may make the system inadequate for restoration.

OBJECT OF THE INVENTION

It is, therefore, an important object of the present invention to provide an improved high-gradient magnetic separator whose drop in capability or filtering rate is effectively measured to enable a flushing thereof efficiently for its capability restoration.

Another object of the present invention is to provide a high-gradient magnetic separator which is superior in magnetic separation of magnetically susceptible components from a filterable fluid to existing magnetic and other separators.

Still another object of the invention is to provide a magnetic separator which has extended useful life and is recoverable in its capability with ease by flushing.

SUMMARY OF THE INVENTION

These and other objects are attained in accordance with the present invention by a method of operating a magnetic separator including a filter mass traversed by a stream of fluid containing magnetically susceptible components to be separated for exerting a magnetic field of high field gradient thereon to collect the magnetically susceptible components therein whereby the inductance of the mass changes as it magnetically collects the components from the fluid stream, the method comprising the steps of: monitoring the change in the inductance of the filter mass during the magnetic collection of the components; and generating an electric signal upon detection of the monitored inductance exceeding a predetermined value.

The method may further include the step of automatically producing an operator-alerting warning with the electric signal and/or the step of automatically terminating the magnetic collection of the components and back-flushing the filter mass in response to the generation of the electric signal.

An apparatus according to the present invention may comprise means for monitoring the change in the inductance of the filter mass during the magnetic collection of the components and means for generating an electric signal upon detection of the monitored inductance exceeding a predetermined value. The lastmentioned means may have associated therewith means for automatically producing an operator-alerting warning with the electric signal and/or means in response to generation of the electric signal for automatically terminating the magnetic collection of the components for backwashing the filter mass.

In accordance with an important aspect of the present invention, a magnetic filter mass is constituted by a porous body comprising a substrate composed of a non-magnetic substance and the body has interconnected pores therein open to outer surfaces thereof and at least a portion of the walls of said pores coated with a layer of a magnetizable substance.

BRIEF DESCRIPTION OF THE DRAWING

These and other features, aspects and advantages of the present invention will become more readily apparent from the following description of embodiments thereof reference being made to the accompanying drawing in which.

SPECIFIC DESCRIPTION

Figure 1:
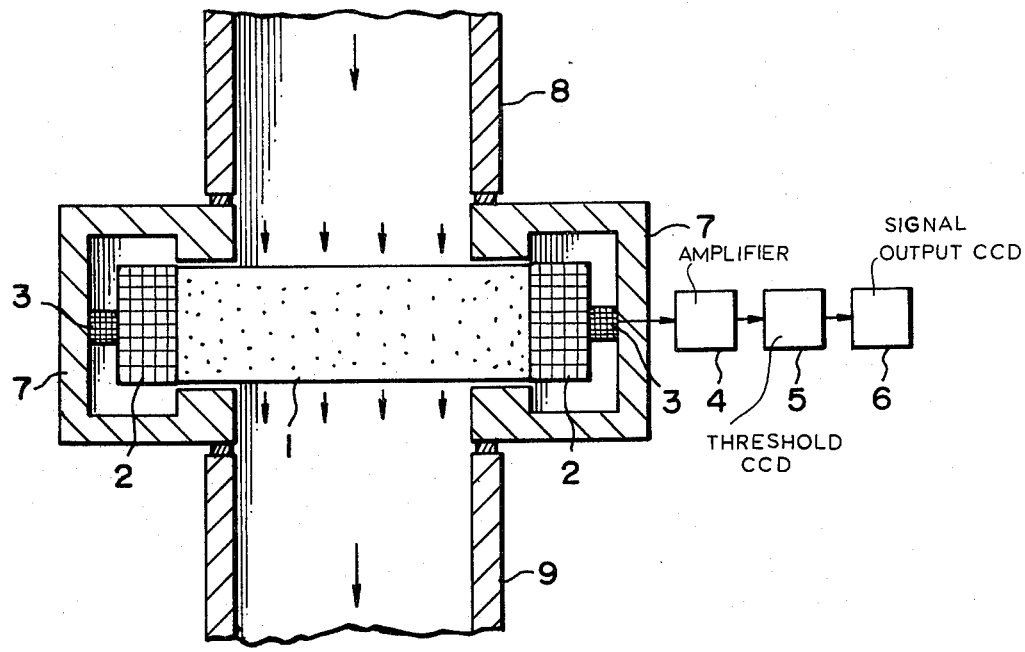
FIG. 1 is a schematic view partly in section illustrating a system for monitoring the capability of a magnetic filter in accordance with the present invention.

Referring to FIG. 1 there is shown a magnetic separator including cylindrical filter mass 1 comprising a plurality of discrete elements permanently magnetized or susceptible to magnetization by an external magnetic field which may as shown be applied by a coil 2 surrounding the mass 1. The filter mass may be constituted as a magnetic grade stainless-steel wool but is preferably of any of constructions as described hereinafter.

The coil 2 is shown received within an annular housing 7 which constitutes a holder for the cylindrical filter mass 1 and, composed of a magnetically permeable material, is also designed to provide magnetic paths for the magnetic field generated by the coil 2 so that the magnetic fluxes may effectively pass through the cylindrical mass 1 more densely in the radially outer region thereof.

The annular member 7 has an inlet tube 8 tightly fitted thereto through which a filterable fluid is introduced. An outlet tube 9 is likewise fitted to the annular member 7 for discharging the filtrate issuing from the filtrant mass 1.

The coil 2 when energized applies an axial magnetic field to magnetizable elements of the filtrant 1 to provide therein a multiplicity of regions of high field gradient so that magnetically susceptible components in the filtrable fluid stream are effectively attracted thereto and collected thereby. Simultaneously, non-magnetic components in the fluid mechanically adsorb on the elements constituting the porous mass 1 to act as a mechanical filter with the filtrate being discharged through the outlet duct 9. In the illustrated arrangement, the magnetic field is created traversing the cylindrical mass 1 more intensely in the radially outer region thereof in which the annular flanges of the receptacle 7 are juxtaposed forming annular magnetic poles and less in the central region of the mass 1. As a consequence, the fluid introduced from the inlet 8 and passing through the filtrant 1 is locally variably affected magnetically so that magnetic components tend to be collected much more in the annular outer region and non-magnetic components tend to be recovered much more in the central region of the mass 1. This configuration of the filtrant mass 1 allows the effective use of the entire body thereof for uniform reception of separable components in the fluid to assure an extended life of filtration and a stabilized filtering operation.

It will be noted that the magnetic field applied to the filter mass 1 may be regulated as to its strength and configuration as desired with the input current applied to the coil 2 and by design of configuration of the annular receptacle 7 serving as a field distributor to attain a maximum filtration ability and insure a life and efficiency of the system depending upon the sort of the fluid to be treated.

In accordance with an important aspect of the present invention, the separator of FIG. 1 is shown provided with a sensing system designed to monitor the clogging of the filtrant mass 1 with magnetic components or contaminants of the fluid. This system which is based upon the recognition that as magnetic components accumulate on the filtrant mass 1, its inductance increases, comprises a sensing coil 3 disposed in the vicinity of the mass 1, an amplifier 4, a threshold circuit 5 and a signal output circuit 6 arranged in series to provide an appropriate signal in response to the inductance signal sensed by the coil 3 exceeding a predetermined value.

Figure 2:
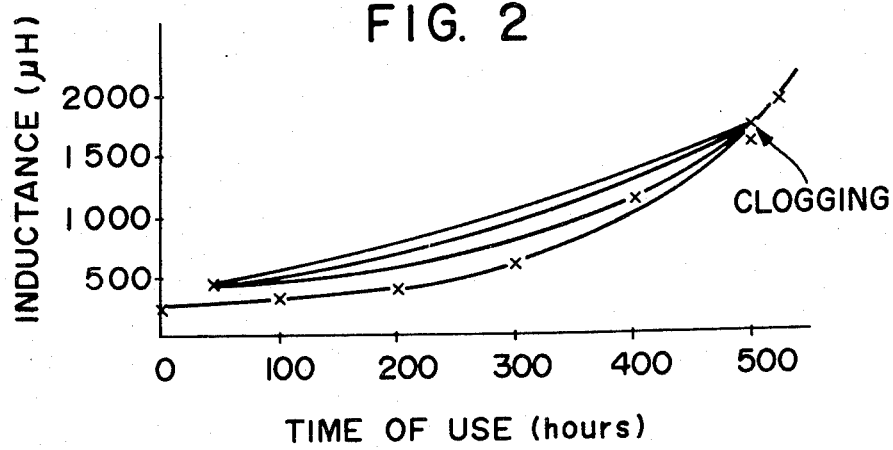
FIG. 2 is a graph showing change of inductance of a magnetic filter mass plotted with respect to time of use.

FIG. 2 shows a graph representing the change of inductance versus time observed with a filter mass 1 comprising a stainless-steel wool placed in a magnetic field of 6800 Gauss and used for purifying a water-base machining fluid contaminated to contain iron particles of 0.1 $\mu$m size of a wire-cut electrical discharge machining operation. The filtrate shows an excellent filtering performance. In the continued use, the filtrant mass initially shows an inductance of 250 $\mu$H which increased with time as shown. After 500 hours of a filtering operation, a value of 1500 $\mu$H was reached and then the filter mass was subjected to a back-washing with an air stream of a pressure of 2.3 Kg/cm$^2$. With a cycle of filtration and back-flushing effected repetitively, the inductance changed following the closed loops as shown in FIG. 2, assuring semi-permanent utility of the filter mass with an equalized filtration performance.

In FIG. 1, the amplifier 4, the threshold circuit 5 and the signal output circuit 6 are each of any well-known design. For example, the threshold circuit 5 may be a Schmitt-trigger circuit adapted to provide an output when a threshold level set therein is traversed by the incoming electrical magnitude from the amplifier 4, which is proportional to the inductance value of the mass 1 continuously detected by the sensing coil 3. The output circuit 6 may be an electrooptical display or buzzer to provide a visible or audible indication. Alternatively, it may be adapted to provide an operating signal for automatically switching the operation of the magnetic separator from filtering to back-flushing modes.

Figure 3:
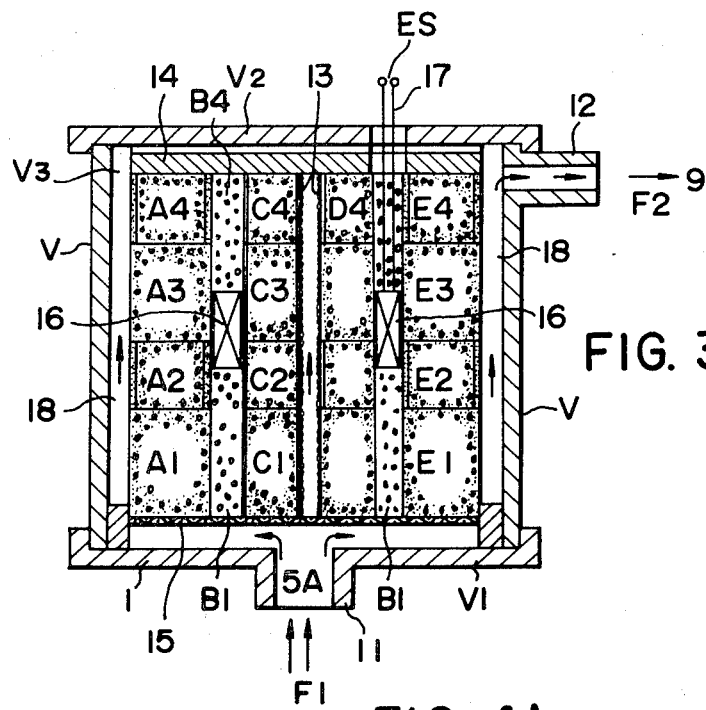
FIG. 3 is an elevational view diagrammatically illustrating a magnetic separator assembly embodying the invention.

In FIG. 3 there is shown another form of the magnetic separator embodying the present invention in which a plurality of filter masses A1, A2, A3, A4; B1–B4; C1–C4; D1–D4 are stacked in a vessel V of a cylindrical form defined between a pair of upper plate V1 and lower plate V2 to form a compartment V3. The lower plate V2 is shown having a fluid inlet 11 through which a filterable or contaminated fluid F1 is introduced. An outlet part 12 is provided in the upper region of the vessel V to discharge a filtrate F2 resulting from the fluid F1 treated past the stacked filter masses A1, . . . , E4. In the vessel V, a cylindrical screen 13 positioned extending centrally through the masses within the chamber V3 between a disk-shaped plate 14 and a similarly shaped screen 15 forms a distributer for the incoming fluid F1 and a holder for the filter masses A1 to E4. Located coaxially with the annularly arranged stack of the filter masses A1 to E4 is a coil 16 energized by a direct-current power supply ES connected therewith via terminals 17 with a current/voltage control unit (not shown) to apply a strong magnetic field to the filter masses A1 to E4.

Thus, the inlet fluid F1 traversing the holder screens 13 and 14 is passed through a multitude of small areas of high magnetic field gradient induced in individual masses A1 to E4 in which areas magnetically susceptible components of the fluid F1 are collected as described earlier with the filtrate F2 emerging past the outer regions of the compartment V3 being discharged through the outlet fitting 12.

Preferably, filter masses A1 to E4 are at least in part constituted, in accordance with a further important aspect of the present invention, by fluid-permeable porous bodies with their walls of interconnected pores having magnetically actuatable substances applied thereto. For example, a set of filter masses A1 to A4 stacked in a vertical column at the left side of the chamber V3 may be such that the mass A1 comprises a simple non-magnetic porous body, the mass A2 comprises a non-magnetic porous body having fine magnetic bodies distributed throughout the non-magnetic substrate and also having porous magnetic membranes applied to the walls of the interconnected pores of the non-magnetic body, the mass A3 comprises a non-magnetic porous body having simply fine magnetic bodies distributed throughout the non-magnetic substrate and the mass A4 comprises a non-magnetic porous and homogeneous body having porous magnetic membrances applied to the walls of the interconnected pores. A stack of filter masses C1 to C4 located to the left side of the central tubular mesh screen 5 may be such that they each comprises a non-magnetic porous body having fine magnetic bodies distributed therein and also having at its outer surfaces porous membrances applied thereto containing finely distributed magnetic bodies with the membranes applied thereto containing finely distributed magnetic bodies with the membranes possibly coated with a porous plastic membrane. In the surroundings of the electromagnetic coil 16, there are provided a stack or stacks of filter masses B1 and B4 which may each comprise a simple non-magnetic porous body treated to protect the coil 16 against corrosion or chemical impairment.

The separator arrangement with the foregoing construction effectively provides an effective combination of filtration, capillary action and high-gradient magnetic separation function which provides a plurality of paths therethrough to effect intimate connection between the fluid and the magnetic material so that components not readily separable mechanically are effectively separated from the fluid F1 under controlled application of a magnetic field. In addition, the superficial porous membrane containing fine magnetic bodies provided along the outer surfaces of the individual filter masses and plastic layers as applied thereover perform filtering functions separately of those of the interior to provide superficial separating functions and protection to the interior filtrants.

At this point it should be noted that the term "magnetic" used herein is intended primarily to mean "magnetizable", "magnetized", "magnetically actuatable" or "magnetically actuated".

In FIG. 4 there are shown portions of masses which may constitute filtrants A1 to E4 of FIG. 3. In FIG. 3(a), the porous integral mass composed of a non-magnetic material and with fluid-permeable interconnected pores 1a in its integral substrate 1b includes fine magnetic particles or bodies 1c distributed throughout the substrate 1b. In FIG. 4(b), the porous integral mass is devoid of magnetic particles in its substrate 1b with the interconnected pores 1a but is provided at its outer surfaces with superficial porous layers 1d applied thereto having fine magnetic particles 1c distributed therein. The fluid-permeable interconnected pores constitute passages for the filterable fluid. In FIG. 4(c), the mass constitutes the mass of FIG. 4(b) and additionally is provided with a porous plastic layer 1e formed upon the porous superficial layer 1c having fine magnetic particles 1d distributed therein. The mass of FIG. 4(d) is basically an equivalent to the combination of the structures of FIGS. 4(a) and (c) except that it is formed with a plurality of tubular fluid passages or channels 1f. These different types of the mass may be stacked in a desired combination to the filtrant unit A1 to E4 as shown in FIG. 3 with the electromagnet arranged in the interior thereof as there shown or in the outerior to surround it. The electromagnet may be altered by a permanent magnet for energizing stacked filter masses A1 to E4.

Figure 5:
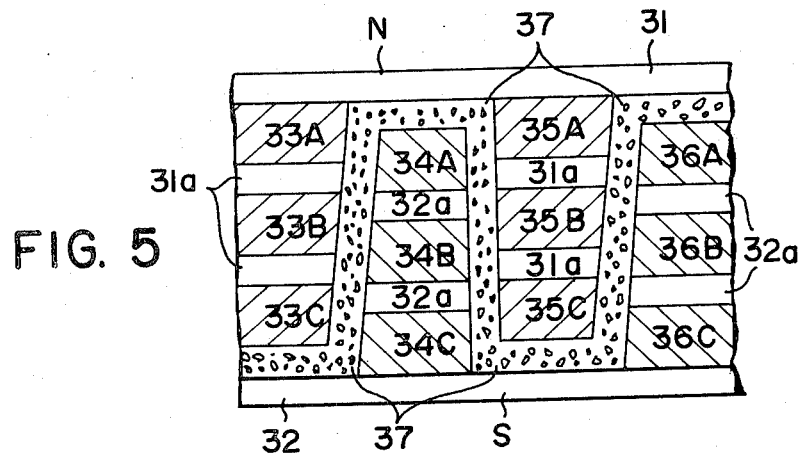
FIGS. 5 and 6 diagrammatically illustrate magnetic filter assemblies basically similar to that of FIG. 3 but in modified forms.
Figure 6:
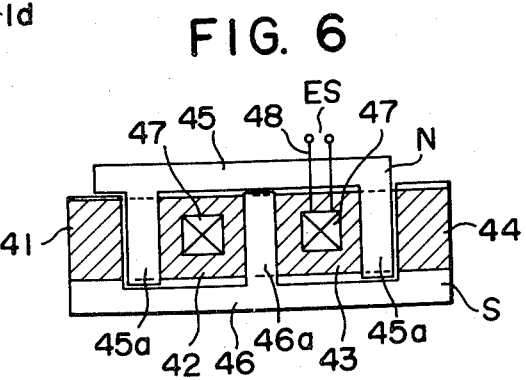

FIGS. 5 and 6 show certain forms of the magnetic actuation system which may be substituted for the unit of FIG. 3 for energizing the stacked filter masses. In the arrangement of FIG. 5, a plurality of magnetic filter masses 33A, 33B, 33C; 34A, 34B, 34C; 35A, 35B, 35C; 36A, 36B, 36C are disposed between a plates 31 and 32 which form N and S poles, respectively, of an external magnetic supply. The N-pole plate 31 is provided with extensions 31a extending in parallel with one another for energizing masses 33B, 33C, 35B and 35C, individually in contact therewith and likewise the P-pole plate 32 with similar extension 32a for energizing masses 34A, 34B, 36A and 36B individually in contact therewith. The masses 33A and 35B are disposed also in direct contact with the plate 31 and the masses 34C and 36C are also contacted directly by the plate 32. The remaining spaces between the plates 31 and 32 are tightly filled with a non-magnetic porous mass 37 for holding the masses 33A to 36C in a tightly packed state between the plates 31 and 32. The stacked plural masses 33A to 36C may be constituted individually by various structures of FIG. 3 in a desired combination and, as magnetically actuated, provides passages therein of high-gradient magnetic field to allow an efficient filtering operation.

The arrangement of FIG. 6 utilizes a series of magnetic filter masses 41, 42, 43 and 44 disposed between N and S pole plates 45 and 46 with the N pole 45 having a pair of extensions 54a occupying the space between the masses 41 and 42 and the space between the masses 43 and 44, respectively. A single extension 46a of the S-pole plate 46 is located centrally in contact with the masses 42 and 43. A magnetic coil 47 is embedded in the masses 42 and 43 and energized by a power supply ES via terminals 48.

Figure 7:
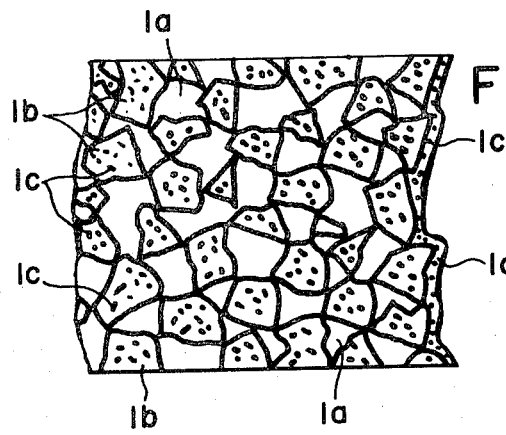
FIGS. 7 to 12 illustrate in enlarged, diagrammatic views various forms of magnetic filter mass embodying the principles of the invention.
Figure 8:
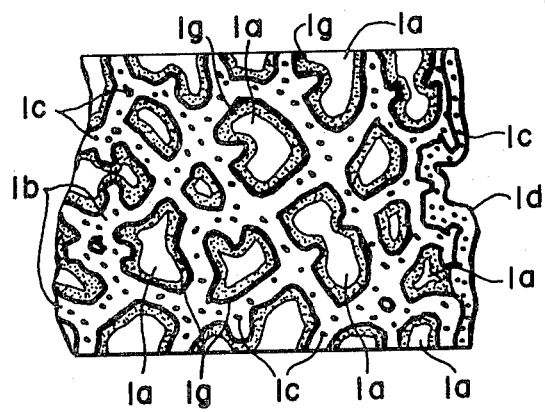

FIGS. 7 to 12 show in enlarged, diagrammatic view of various filter mass structures in accordance with the present invention. The structure of FIG. 7 corresponds to that of FIG. 4(a) and is constituted by a porous sintered body 1b of a non-magnetic metal or non-metallic substance having a multitude of interconnected pores 1a therein which are of course open to the outer surfaces of the body 1b. As mentioned previously, the body or substrate 1b may contain finely divided magnetic particles or bodies 1c uniformly distributed therein. The structure of FIG. 8 is a foam body comprising a continuous, integral or homogeneous substrate 1b of a non-magnetic substance and interconnected pores 1a open to outer surfaces, the substrate 1b being shown again having fine magnetic particles 1c evenly distributed therethroughout. In this embodiment, the walls of the interconnected pores 1a interior of the body are formed with a layer of magnetic substance 1g which is applied thereto by electroless or chemical deposition, vapor-decomposition deposition, evaporation deposition, fusion-spraying deposition or the like with or without a subsequent electrodeposition.

Figure 4A:
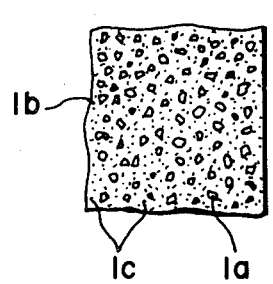
FIGS. 4A, 4B, 4C and 4D illustrate various forms of a magnetic filter mass in accordance with the present invention.
Figure 4B:
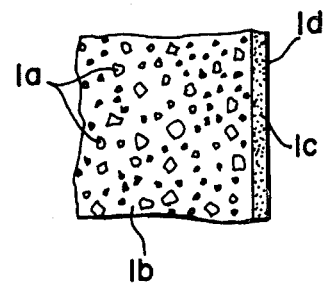
Figure 4C:
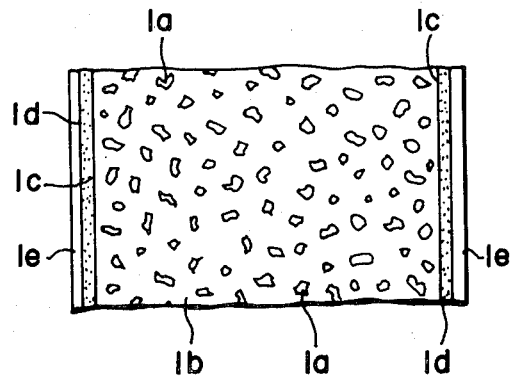
Figure 4D:
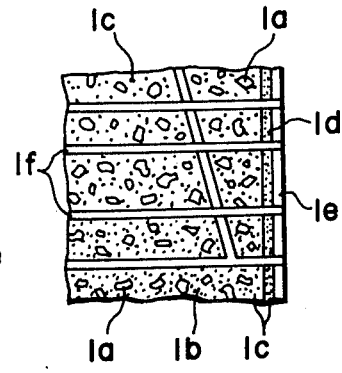

In both the structures of FIGS. 7 and 8, the porous body is further formed on its outer surfaces with an adhesive (non-magnetic base) coating 1d (see also FIG. 4(b)) having finely divided magnetic particles or bodies 1c evenly distributed therein.

Figure 9:
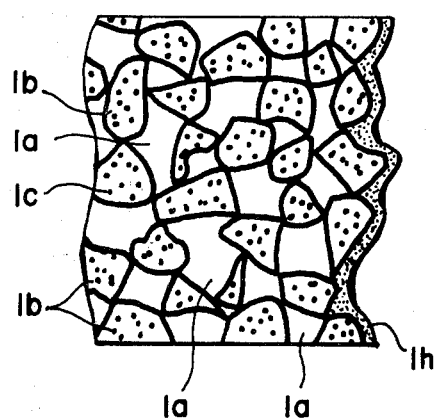
Figure 10:
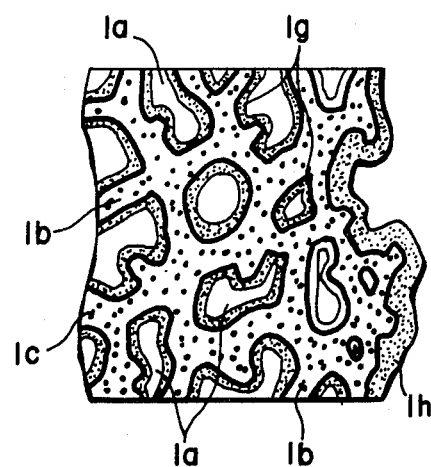
Figure 11:
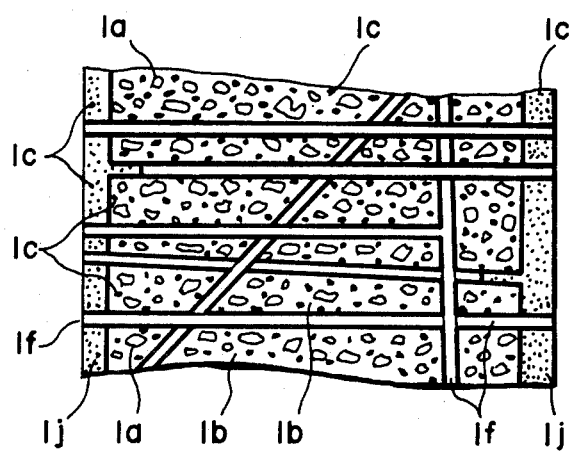
Figure 12:
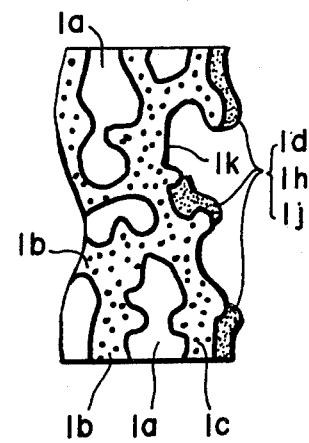

The filter mass structures shown in FIGS. 9a and 10 are similar to those of FIGS. 7 and 8, respectively except that instead of an adhesive layer 1d containing magnetic particles 1c, a deposition layer 1h of a magnetic substance as formed on the walls of the pores 1a inside the body (FIG. 8) is applied on the outer surfaces exclusively (FIG. 9) or as well (FIG. 10). The structure of FIG. 11 is further formed interior of the body with additional fluid passages or channels 1f as in the embodiment of FIG. 4(d) and replace the homogeneous magnetic layer 1h of FIGS. 9 and 10 with a deposition layer 1j of a non-magnetic metal or alloy having finely divided magnetic particles 1c uniformly distributed therein. FIG. 12 shows a modification of the filter mass structures described above in which the magnetic layer 1d, 1h 1j applied to the outer surfaces of the porous body 1 has stripped or open portions of a controlled size to regulate the permeability 2 of the fluid into the interior of the mass 1.

The porous body 1 constituting various filter mass structures in the foregoing is preferably a foam body composed of a high polymer or plastic such as polyethylene, polyvinylchloride, polyolefin, polystyrene, polyurethane, phenol resin, urea resin, fluorine resin (tetrafluoroethylene), cellulose viscose, nylon or rubber and may be a coke, lava, conglomerate, sintered or baked material, porous carbon, texile cloth or inorganic or organic porous membrance.

As a foaming agent to produce a foam body of the plastic or high-polymer compositions as listed above, diazoaminobenzene, azoisobutyl-1, 2 dinitril, sulfonylhydrazide, azodicarboamide, sodium bicarbonate, ammonium bicarbonate, pentane, butane, propane and halides are effectively utilized.

Magnetic materials constituting finely divided particles 1c or deposition layers 1h may be a metal or alloy selected from the group which consists of ferrite family, rare-earth magnetic family, cobalt magnetic family, platinum-cobalt family and including $Fe_3O_4$, $Fe_2O_3$, Fe, Ni, $Fe_{75}Si_{15}B_{10}$, $Co_{75}Si_{15}B_{10}$, $Ni_{75}Si_8B_{17}$, $Fe_{80}P_{13}C_7$, $Fe_5Co_{70}Si_{15}B_{10}$, $Fe_{78}Si_{10}B_{12}$ and $Fe_{50}Ni_{50}$.

Finely divided magnetic material 1c when distributed throughout the substrate 1b may be of a size ranging between 0.01 and 300 μm and when distributed in the coatings 1d 1j may be of a size ranging between 0.1 to 20 μm. The thickness of the layers 1d, 1h, 1j preferably ranges between 0.5 and 30 μm.

EXAMPLE I

A mixture of 100 parts polystyrene and 35 parts finely divided ferrite of 10 to 200 μm size with 0.5% by weight azodicarboamide as a foaming agent is heated at 145° C. under a reduced pressure to form a foam body throughout which the ferrite particles are evenly distributed. The foam body is cut into a block of 70 m long, 150 mm wide and 10 mm thick for use as a filter mass. Meanwhile, an adhesive is prepared composed of 25% by weight styrene and 75% by weight butadiene in which ferrite particles of 0.1 to 3 μm are evenly distributed and contained in an amount of 35% by volume. Then, the adhesive is applied to outer surfaces of the porous block in a thickness of 0.01 mm. When a fluid containing magnetic components of sizes in excess of 0.1 μm is passed through this mass across which an external field of 4000 Gauss is applied, an excellent filtering performance is attained with a filtering efficiency in excess of 95%. Following tests with similar filter masses produced with varying sizes of magnetic particles, it has been shown that this efficiency is substantially obtainable when the particle sizes of finely divided material ranges between 0.01 and 300 microns.

EXAMPLE II

A foam body prepared in the manner described in EXAMPLE I is treated to form a structure as illustrated in FIG. 10. To this end, the foam body is first subjected to degreasing, washing and sensitized in a sequence in the conventional manner. The sensitized body is immersed in an electrodepositing both containing nickel sulfate, nickel chloride and nickel borate with a pH adjusted at 4 to 6 by addition of a surfactant and electrodeposition is carried out to form deposition layers 1g the walls of the interconnected pores 1a as well as along outer surfaces of the body 1.

Figure 13:
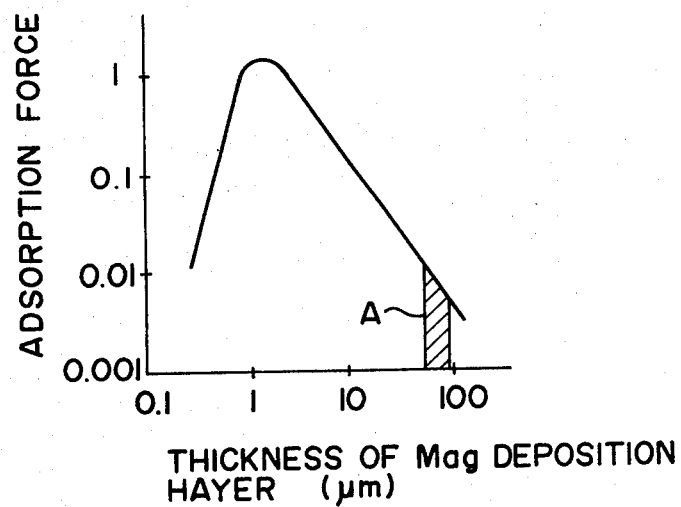
FIG. 13 is a graph showing a relationship of the thickness of magnetic deposition layer versus the adsorption force of the resulting filter mass.

In FIG. 13, these is shown a graph representing a relationship observed between the thickness of the magnetic deposition layer and the adsorption force:

$$F\leftarrow = \chi V H \frac{\partial H}{\partial Z}$$

where H is the magnetic field, V is the velocity of the fluid in the flow direction Z and X is a constant of the resulting magnetic filter mass. In the graph, the shade portion represents the performance of conventional magnetic filters. It is apparent that, with a magnetic deposition layer, best results are obtained when its thickness ranges between 0.5 and 30 microns.

Figure 14:
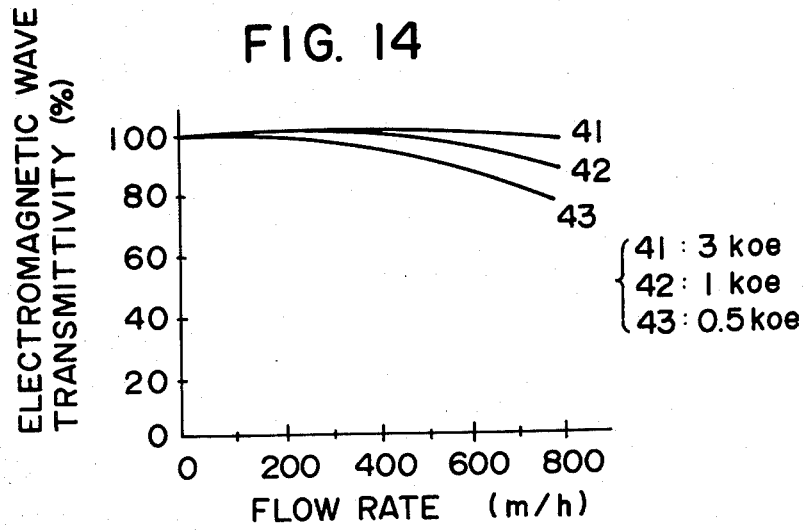
FIG. 14 is a graph showing a relationship of the change of electromagnetic transmissivity of a fluid versus a flow velocity with respect to different magnetic field strengths applied.

FIG. 14 illustrates in a graphical representation of performance of a filter mass prepared in the manner of EXAMPLE II to have a magnetic deposition coating of a thickness of 1 μm as used for purification of a contaminated water-base EDM (electrical discharge machining) fluid, where the graph is plotted in terms of the velocity of the fluid versus the electromagnetic transmittivity. In the graph, three curves A, B and C correspond to the use of external magnetic fields of intensities of 3 KOe, 1 KOe and 0.5 Oe, respectively which are applied to the filter mass. These curves have demonstrated that when the mass is formed with deposition layer described above, there appears no substantial drop in the filtering efficiency with increase in the fluid velocity.

EXAMPLE III

A plurality of foam bodies prepared in the manner described in EXAMPLE I and treated in the manner described in EXAMPLE II are stacked to form a magnetic filter mass unit as illustrated in FIG. 3. The coil is energized to generate an external magnetic field of 4800 Gauss which is applied to the masses of the unit.

FIG. 5 shows in a graphical form, performance of a conventional magnetic filter represented by curve A as well performance of this filter unit represented by curve B, the graph being shown with the pressure head of the filters plotted along the ordinate and the time of use (months) plotted along the abscissa. With the conventional filter unit which had an effective surface area of 1.8 m$^2$, it is seen that its pressure head builds up immediately after the start of use and, then from the built-up level, again rises sharply after a period of nine (9) months elapses. After twelve (12) months of use, it showed a collection of iron particles of 4.6 Kg from a contaminated water which was of a temperature of 25° C. and had an optical absorptivity of less than 30%. In comparison, the filter unit of Example III which had an effective surface area of 0.3 m$^2$ shows an extremely slow pressure-head built-up thereacross. It yet exhibited a superior separation effectiveness, permitting iron particles as fine as 0.01 to 30 μm to be collected by in excess of 90% and was capable of recovery of the original filtering ability when it is backflushed with an air stream after the use of 18 months.

Figure 16:
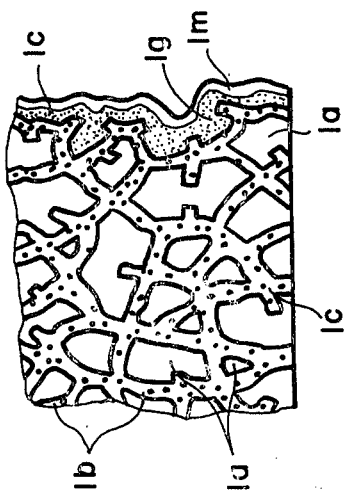
FIGS. 16 and 17 diagrammatically illustrate further forms of a filter mass according to the present invention.
Figure 17:
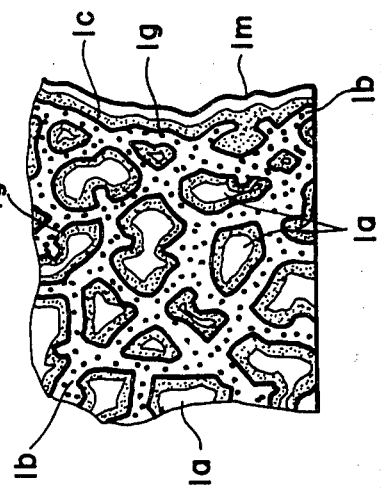
Figure 15:
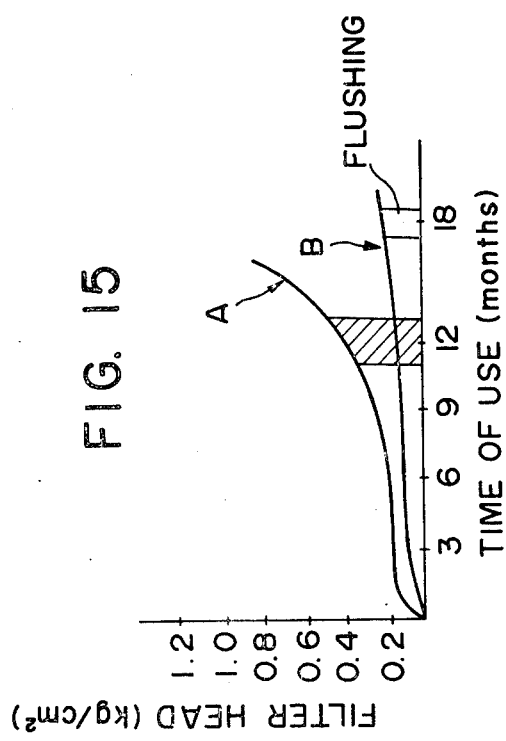
FIG. 15 is a graph showing change of pressure head of conventional and inventive filter masses plotted with respect to time of use.

FIGS. 16 and 17 shows a magnetic filter mass, according to the invention, which is of a structure similar to that shown in FIG. 2(c) or FIGS. 8, 9 or 10 but includes a protective layer 1 m of a high-polymer covering a magnetic layer 1d or 1g over the outer surfaces of the body or also over the interior walls of the pores 1a. The high-polymer layer may be of a porous membrane prepared separately which is then applied to the layer 1d or 1g by means of an adhesive or may be of a liquid-phase which is applied upon the layer 1d or 1g by spraying. In these embodiments as well, the substrate 1b may have optionally fine magnetic particles 1c uniformly distributed therein.

Figure 18:
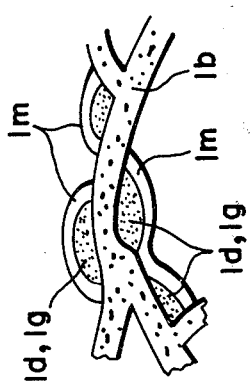
FIG. 18 is an enlarged diagrammatic view of a structure of the filter mass shown in FIGS. 16 and 17.

FIG. 18 diagrammatically represents an enlarged view of a portion of the structures of FIGS. 16 and 17. Magnetic layers 1d, 1g are shown attached to the substrate 1b and at the same time covered with porous protective layers 1m to be sealed thereby.

EXAMPLE IV

A mixture of polystyrene with 0.5% by weight azodicarbomide as a foaming body is heated at 145° C. under a reduced pressure to form a porous body for use as a filter mass. The mass is then plated by chemical or electroless deposition with a nickel layer of 1 μm thickness over the outer surfaces thereof as well as throughout the walls of the interconnected pores therein. Thereafter, a polystyrene film of 1 μm is applied over the nickel layer. When the mass is placed under an external magnetic field of 3 KOe, it allows an filtering operation to treat the contaminated water discharge a filtrate of substantially original purity at a velocity of 500 meters/hour. The test is also carried out with a HCl solution of PH 2. It has been found that the filtrant provided with the protective films allows a continuous operation over 300 hours to be performed with stability against the corrosive fluid.

Figure 19:
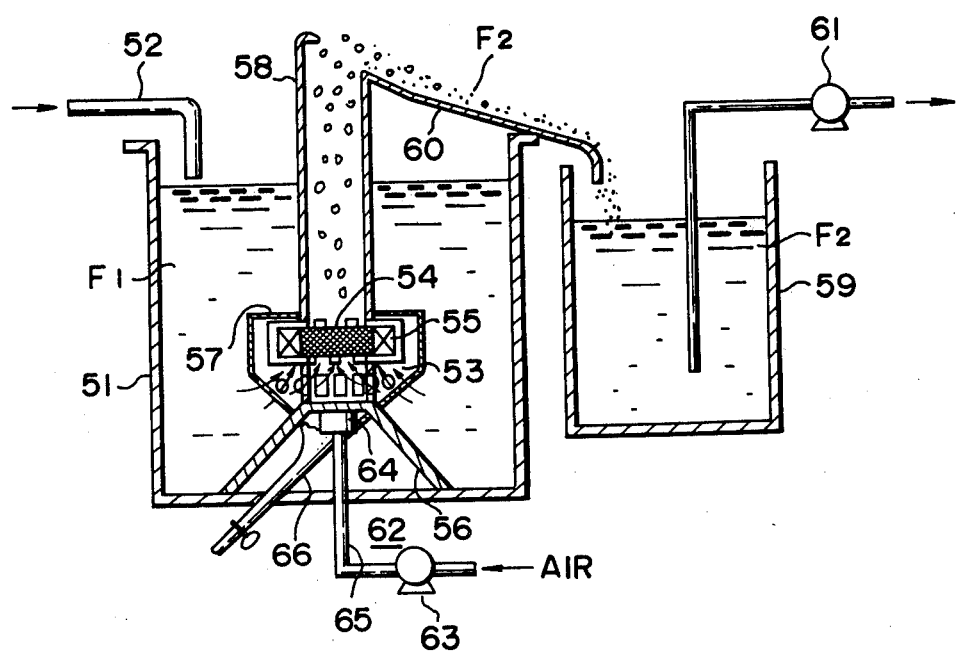
FIG. 19 is an elevational diagrammatic view illustrating a magnetic filtering system further embodying the present invention.

In FIG. 19, there is shown a further embodiment of the present invention designed to increase the filtering efficiency and reduce the tendency of a magnetic filter mass to become clogged thereby extending the utility life thereof. This embodiment includes a separatiion vessel 51 into which a liquid E1 to be treated is introduced via a supply 52. In the vessel 51 there is arranged a magnetic filter unit 53 comprising a magnetic filter mass 54 as has been described and a coil 55 for energizing the mass 54, the unit 53 being carried by a support member 56 with legs mounted on the bottom of the vessel 51. The filter unit is housed in a receptacle 57 which has outlet conduit 58 upstanding therefrom for filtrate which is carried into a storage vessel 59 over a trough 60 connecting the two vessels 51 and 59. The purified liquid F2 is shown to be fed out by a pump 61 for utility.

In accordance with an aspect of the present invention, the magnetic filter unit 53 is associated with an aeration system 62 designed to supply an air stream to the region of the filtrant mass 54 by means of a compressor 63 via a conduit 64 which is connected to the unit 53 via an adjustor valve 64. The receptacle 57 defining the aeration filter unit 53 is also provided with a discharge pipe 65 for discharging the components collected in the mass 54.

The air stream supplied under pressure by the compressor 63 through the valve 64 acts to entrain therewith the filtrable liquid F1 in the vessel 51 so that a flow of homogeneous liquid/air bubble mixture is provided. By virtue of the bubble pumping action, the liquid/air mixture rises past the filter mass 54 energized by the electromagnetic coil 55 and, undergoing a magnetic separating function therein, is permitted to continually rise through the outlet conduit 58. In traversing the filter mass 54, the liquid F1 is thus agitated with the compressed air and homogeneously admixed therewith, the mixture passing through a multiplicity of areas therein of high magnetic field gradient which is in the agitated state. This is found to markedly increase the filtering efficiency while rendering the mass 54 less clogged. A high-velocity displacement of air effectively through the mass 54 strips larger non-magnetic contaminants from the collected area therein. This arrangement is therefore highly suitable for selective separation of magnetic components.

There is thus provided, in accordance with the present invention, an improved magnetic separator as well as a method of operating the same which increase efficiency, prolong the useful life and decrease the clogging tendency of the magnetic filter mass.

I claim:

1. In a magnetic separator including a filter mass for traversal by a stream of fluid containing magnetically susceptible components to be separated for exerting a magnetic field of high field gradient thereon to collect said components therein, the improvement wherein said mass is constituted by a porous body comprising a continuous substrate composed of a non-magnetic substance, said body having interconnected pores therein open to outer surfaces of the body, at least a portion of the walls of said pores defining said substrate and being coated with a substantially continuous layer of a magnetic substance.

2. The improvement defined in claim 1 wherein said porous body comprises a body selected from the group which consists of a foam body of high polymer or plastic, coke, lava, conglomerates, sintered or baked bodies, porous carbon, textile, cloth and inorganic or organic membrances.

3. The improvement defined in claim 1 wherein said magnetic layer is a homogeneous layer of magnetizable metal.

4. The improvement defined in claim 1 wherein the inductance of said body changes with collection of said components from said stream of fluid, further comprising:

means for monitoring said change in said inductance during the magnetic collection of said components; and means for generating an electrical signal upon detection of the monitored change in said inductance exceeding a predetermined value.

5. The improvement defined in claim 4, further comprising means for automatically producing an operator-alerting warning with said electrical signal.

6. The improvement defined in claim 4, further comprising means for automatically terminating the magnetic collection of said components and backflushing said body in response to said electrical signal.

7. The improvement defined in claim 1, further comprising means for injecting ahead of said body a gas stream into said fluid, said fluid being a liquid and mixing with said gas stream for passage through said body.

8. In a magnetic separator including a filter mass for traversal by a stream of fluid containing magnetically susceptible components to be separated for exerting a magnetic field of high field gradient thereon to collect said components therein, the improvement wherein said mass is constituted by a porous body comprising a continuous substrate composed of a non-magnetic substance, said body having interconnected pores therein open to outer surfaces of the body at least a portion of the substrate walls of said pores being coated with a substantially continuous layer of a magnetic substance, said layer of a magnetic substance comprising a non-magnetic substratum substance having finely divided magnetizable material uniformly distributed in said substratum.

9. In a magnetic separator including a filter mass for traversal by a stream of fluid containing magnetically susceptible components to be separated for exerting a magnetic field of high field gradient thereon to collect said components therein, the improvement wherein said mass is constituted by a porous body comprising a continuous substrate composed of a non-magnetic substance, said body having interconnected pores therein open to outer surfaces of the body, at least a portion of the substrate walls of said pores defining said substrate being coated with a substantially continuous layer of a magnetic substance, said layer of a magnetic substance being covered with a layer of polymeric material.

10. In a magnetic separator including a filter mass for traversal by a stream of fluid containing magnetically susceptible components to be separated for exerting a magnetic field of high field gradient thereon to collect said components therein, the improvement wherein said mass is constituted by a porous body comprising a continuous substrate composed of a non-magnetic substance, said body having interconnected pores therein open to outer surfaces of the body, at least a portion of the substrate walls of said pores being coated with a substantially continuous layer of a magnetic substance, said porous body containing finely divided magnetizable material uniformly distributed therein.

* * * * *